(12) United States Patent
Bohl

(10) Patent No.: US 6,773,491 B1
(45) Date of Patent: Aug. 10, 2004

(54) ACTIVATED CARBON FILTER

(75) Inventor: Mattias Bohl, Leutenbach (DE)

(73) Assignee: DaimlerChrysler AG, Stuttgart (DE)

( * ) Notice: Subject to any disclaimer, the term of this patent is extended or adjusted under 35 U.S.C. 154(b) by 838 days.

(21) Appl. No.: 09/686,097

(22) Filed: Oct. 12, 2000

(30) Foreign Application Priority Data

Oct. 29, 1999 (DE) .......................................... 199 52 092

(51) Int. Cl.$^7$ ............................................. B01D 53/04
(52) U.S. Cl. ............................. 96/130; 96/132; 96/135; 96/137; 96/143; 96/147; 96/153; 55/385.3; 55/516; 123/519
(58) Field of Search ................... 96/126, 127, 130–135, 96/137, 139–142, 146, 147, 149, 152–154, 385.3, 516–519; 123/518, 519

(56) References Cited

U.S. PATENT DOCUMENTS

| | | | | |
|---|---|---|---|---|
| 3,730,158 A | * | 5/1973 | St. Amand .................. | 123/519 |
| 3,944,403 A | * | 3/1976 | Simpson et al. .............. | 96/131 |
| 4,059,409 A | * | 11/1977 | Barto et al. .................. | 422/169 |
| 4,308,840 A | * | 1/1982 | Hiramatsu et al. .......... | 123/519 |
| 4,544,384 A | * | 10/1985 | Metschl et al. .............. | 96/130 |
| 5,148,793 A | * | 9/1992 | Reddy ......................... | 123/520 |
| 5,207,808 A | * | 5/1993 | Haruta et al. ................. | 96/131 |
| 5,393,329 A | * | 2/1995 | Inagaki et al. ................ | 96/131 |
| 5,501,723 A | * | 3/1996 | Andress et al. ............... | 96/131 |
| 5,505,825 A | * | 4/1996 | Gold et al. .................... | 95/126 |
| 5,623,808 A | * | 4/1997 | Franklin et al. .............. | 53/399 |
| 5,718,209 A | * | 2/1998 | Scardino et al. ............. | 123/519 |
| 5,743,943 A | * | 4/1998 | Maeda et al. ................. | 96/126 |
| 5,851,268 A | * | 12/1998 | Hyodo et al. ................. | 96/131 |
| 5,914,457 A | * | 6/1999 | Itakura et al. ................ | 96/130 |
| 6,047,687 A | * | 4/2000 | Ishikawa et al. ............ | 123/518 |
| 6,279,548 B1 | * | 8/2001 | Reddy ......................... | 123/520 |
| 6,524,374 B2 | * | 2/2003 | Moriyama et al. ........... | 96/131 |
| 6,540,815 B1 | * | 4/2003 | Hiltzik et al. ................ | 95/146 |
| 2001/0015134 A1 | * | 8/2001 | Uchino et al. ................ | 96/130 |
| 2001/0020418 A1 | * | 9/2001 | Yamafuji et al. ............. | 96/130 |
| 2002/0124732 A1 | * | 9/2002 | Hara et al. .................... | 96/131 |
| 2003/0084789 A1 | * | 5/2003 | Kim ............................. | 96/121 |
| 2003/0145731 A1 | * | 8/2003 | Biasio ......................... | 96/130 |
| 2004/0007135 A1 | * | 1/2004 | Ikuma et al. ................. | 96/135 |
| 2004/0031469 A1 | * | 2/2004 | Reddy ......................... | 123/519 |

FOREIGN PATENT DOCUMENTS

| | | |
|---|---|---|
| DE | 25 00 470 | 7/1975 |
| DE | 36 09 976 | 10/1986 |
| DE | 38 42 994 A1 * | 7/1990 |
| DE | 195 14 887 | 10/1996 |
| DE | 197 08 692 | 9/1998 |
| WO | WO 92/01585 A1 * | 2/1992 |

* cited by examiner

Primary Examiner—Robert H. Spitzer
(74) Attorney, Agent, or Firm—Klaus J. Bach

(57) ABSTRACT

In an activated carbon filter for reducing vapor emissions from a fuel supply system including, in a filter housing, a first connecting section for communication with the atmosphere and a second connecting section for communication with the fuel supply system, an activated carbon filter section is disposed between the first and second connecting sections and a filter layer of a highly adsorptive filler material layer is disposed between the activated carbon filter section and the first connecting section to prevent any escape of vapors through the first connecting section to the atmosphere.

6 Claims, 1 Drawing Sheet

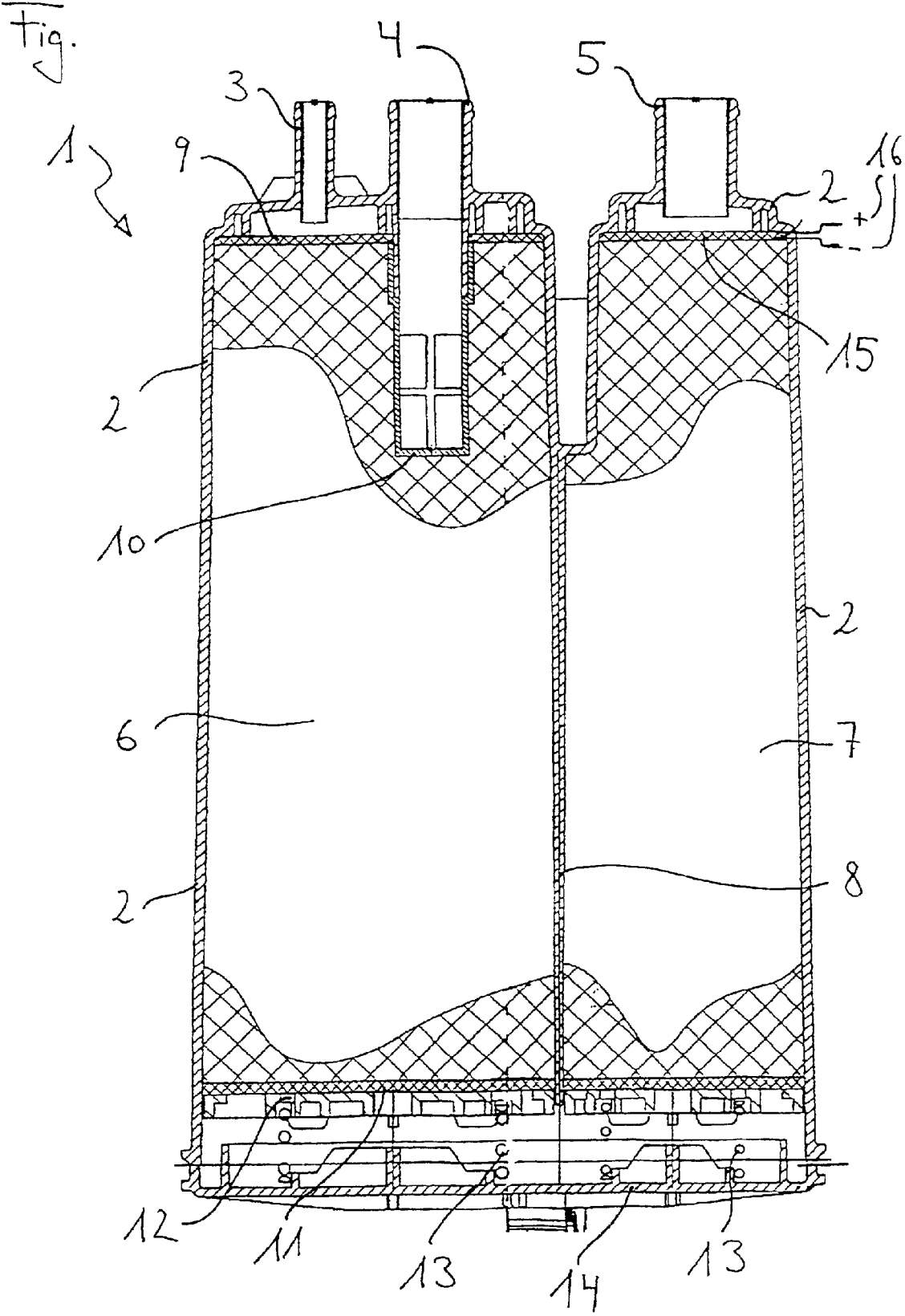

ACTIVATED CARBON FILTER

BACKGROUND OF THE INVENTION

The invention relates to an activated carbon filter, particularly for reducing the vapor emissions from a fuel system of a vehicle, including a first and a second connecting section, a filter section including activated carbon between the two connecting sections and a filter layer which consists of a highly effective adsorber material and which has an activated carbon section disposed adjacent to, and covering, the first connecting section.

An activated carbon filter of the type referred to above is known from DE 197 08 692 A1. It discloses an adsorption filter with a first and a second filter area. The first filter area includes a coarse filter. It is filled with activated carbon or another adsorber material and has a high adsorption capacity and a low pressure loss. The second filter area consists of a textile activated carbon surface structure based on a fleece or a fabric and is used to enclose or cover the coarse filter.

In order to prevent in motor vehicles the release of hydrocarbon-containing fuel vapors from a fuel tank or a carburetor of a motor vehicle, fuel supply system are sealed structures and include activated carbon filters. When the internal combustion engine is at a standstill, fuel vapors escaping from the tank area of the fuel supply system reach the activated carbon filter where most of the hydrocarbon components are retained and prevented from escaping into the environment. When the internal combustion engine is operating, the activated carbon filter is flushed with intake air. In this process, the hydrocarbons deposited in the filter are again supplied to the internal combustion engine for combustion therein.

DE 36 09 976 C2 discloses an activated carbon filter for a fuel supply system of a motor vehicle which includes a container filled with activated carbon particles. This container includes at one side an opening for the admission of fresh air which opening is covered by filter material. At the opposite side of the container, means are provided for the connection of he activated carbon filter to the fuel supply system. In the area of the opening for the admission of fresh air to the activated carbon filter, an electric heating arrangement is provided in the form of a metallic grid structure. When the engine is slut down, hydrocarbon-containing gas evaporates from the fuel supply system and reaches the activated carbon filter, which adsorbs the hydrocarbons. As the engine is started, fresh air flows into the activated carbon filter through the respective opening. The fresh air is preheated by the heating arrangement, whereby the activated carbon filter is regenerated as soon as engine operation begins and the hydrocarbons adsorbed by the activated carbon particles are released and supplied to the internal combustion engine for combustion therein.

DE 25 00 470 A1 discloses a filter element which includes fibers of activated carbon. The fibers of activated carbon are in the form of a woven fabric or a fleece and several layers thereof are disposed in the filter housing so as to extend in a plane normal to the flow direction of a gas to be filtered. For the separation of the layer of activated carbon, spacer elements are provided, which consist of a thermoplastic polymer.

It is further known from DE 195 14 887 A1 to provide in air cleaning systems a thin filter layer consisting of an adsorbing cover fleece which may contain activated carbon.

It is the object of the present invention to provide an activated carbon filter of the type referred to above with which hydrocarbons can be practically fully filtered out of a gas mixture with a high hydrocarbon content so that their escape into the environment is prevented and the filter can be again effectively desorbed in a simple and effective manner.

SUMMARY OF THE INVENTION

In an activated carbon filter for reducing vapor emissions from a fuel supply system including, in a filter housing, a first connecting section for communication with the atmosphere and a second connecting section for communication with the fuel supply system, an activated carbon filter section is disposed between the first and second connecting sections and a filter layer of a highly adsorptive filler material layer is disposed between the activated carbon filter section and the first connecting section to prevent any escape of vapors through the first connecting section to the atmosphere.

With this activated carbon filter, the hydrocarbon emissions from a fuel system can be reduced to almost zero. This is also true when the filter is heated since the released hydrocarbons are prevented from escaping through the fresh air inlet by the highly adsorptive filter layer.

If the filter layer consists of an electrically conductive adsorber material and can be electrically heated, the filter serves at the same time as the electric heating arrangement. It provides in a simple manner for a rapid regeneration of the activated carbon filter.

The filter layer may also consist of a highly adsorptive material including an activated carbon fabric or an activated carbon fiber fleece. Such a structure provides for a filter layer with a particularly high adsorption capability.

In an advantageous embodiment of the invention, the filter section with activated carbon comprises a housing with at least a first and a second chamber. The chambers are filled with activated carbon pellets. The connecting section for the fuel system is disposed adjacent the first chamber and the connecting section for the fresh air supply is disposed adjacent the second chamber. The two chambers are in communication with each other at the ends thereof remote from the fuel system and gas supply connections by way of a filter fleece or filter fabric. In this way, the activated carbon filter provides for the gas to be filtered a long travel path while the filter arrangement is still relatively small.

It is advantageous if the filter fleece/fabric, which is arranged between the first and the second chambers is provided with a spring-loaded pressure plate which biases the filter fleece/fabric against the activated carbon pellets in the first and, respectively, second chambers. In this way, the activated carbon pellet volume remains compact and dense.

Also, the connecting section for the fuel supply system includes a connector for connection with the fuel tank and a connector for connection with a suction arrangement of the internal combustion engine. A filter fleece/fabric is disposed between the filter section, which includes activated carbon, and the connector for the suction arrangement. The connection for the fuel tank includes preferably a tubular housing structure of a net-like filter fabric, which extends into the activated carbon filter section. In this way, it is made sure that fuel vapors from the fuel supply system are adsorbed in the activated carbon filter over the largest possible activated carbon surface area.

Further features and advantages of the invention will become apparent from following description thereof on the basis of the accompanying drawing.

BRIEF DESCRIPTION OF THE DRAWINGS

The single FIGURE is a cross-sectional view of an activated carbon filter according to the invention.

DETAILED DESCRIPTION OF A PREFERRED EMBODIMENT

The activated carbon filter 1, as shown in FIGURE, is particularly suitable for use in a motor vehicle for the reduction of vapor emissions from a fuel supply system. It includes a housing 2 of polypropylene, polyethylene, or polyamide, which may be glass-fiber reinforced. The housing includes a connecting section with connections 3 and 4 for connection to an internal combustion engine, which is not shown. The first connection 3 is provided for communication with a suction arrangement of the internal combustion engine, that is, with the low pressure area of the engine intake duct downstream of the throttle valve. The second connection 4 is provided for communication with a vent opening of a fuel tank. In another connecting section at the same end of the activated carbon filter 1, there is provided a connection 5 by way of which the activated carbon filter 1 can be in communication with the fresh air atmosphere.

The activated carbon filter 1 includes two different filter chambers 6 and 7 provided for the different connecting sections. The filter chambers 6 and 7 are filled with activated carbon pellets, which are indicated only schematically. The pellet bodies form a granule structure with a particle size of about 2 by 4 mm. They may consist, for example, of charcoal, coconut shells, or olive kernels. The two filter chambers 6 and 7 are separated by a wall 8. The connection 3 for communication with a suction arrangement of an internal combustion engine comprises a filter fleece 9, by way of which gas can flow from the filter to the intake duct of the internal combustion engine. The connection 4 for communication with the tank vent opening includes a tubular housing structure 10, which extends into the first filter chamber 6. This tubular housing structure 10 consists of polyamide or a corresponding material and includes a fine-mesh fabric.

At the end of the activated carbon filter 1 opposite the connecting section with the connections 3, 4 and 5, the chambers are delimited by a filter fleece 11, which closes the first and the second filter chambers 6 and 7. It may be for example, a polyester fiber fleece. The filter fleece 11 provides for communication between the first and second filter chambers 6 and 7.

The filter fleece 11 is engaged by a perforated support frame 12. Springs 13 are disposed between the support frame 12 and a gas-tight end wall 14 of the filter housing 2 so that the activated carbon pellets in the filter chambers 6 and 7 are compressed to a tight package. The connection 5 for communication with the fresh air atmosphere is covered with a filter layer 15 of a highly effective adsorber material so as to be separated thereby from the second filter chamber 7. The filter layer consists of an activated carbon filter fabric or an activated carbon fiber fleece. It is therefore electrically conductive and also highly active with respect to the adsorption of hydrocarbon vapors.

The filter layer 15 is provided with electrical connections 16 for the connection of an electric power source providing a voltage of about 18V for the heating of the filter layer 15. Alternatively to such direct heating of the filter layer 15, means for an indirect heating of the filter layer 15 may be provided for example in the form of electric resistance wires. It is also possible to provide the filter layer 15 without electrical connections, that is, not to provide any heating means for the filter layer to simplify the filter design.

Instead of a filter layer of activated carbon fabric or of an activated carbon fleece, the second filter chamber 7 may include, in an area leading to the connection 5, a highly effective adsorber material on the basis of zeolite, silicious gel, aluminum oxide or di-vinyl benzene styrene material. If appropriate, a heating structure may be provided for the closure of the highly effective adsorption material.

When the internal combustion engine is shut down, hydrocarbon-containing gases, which are released, will escape from the fuel tank of the fuel supply system by way of the tank vent opening and flow, by way of the connection 4 of the activated carbon filter and the tubular housing structure 10, into the filter chamber 6. There, they are adsorbed by the activated carbon pellets while releasing heat. The hydrocarbon-containing gases, which are not adsorbed by the activated carbon pellets in the filter chamber 6, pass through the filter fleece 11 into the second filter chamber 7 in which further adsorption takes place by the activated carbon pellets disposed in the chamber 7. Any release of hydrocarbon-containing gases from the filter chamber 7 by way of the connection 5 for the venting of the activated carbon filter 1 to the atmosphere is prevented however by the highly active filter layer 15 or the alternative connection of the filter chamber 7.

When the internal combustion engine is in operation, a vacuum is present at the connection 3, which is in communication with the engine intake duct downstream of the throttle valve thereof. Hydrocarbons, which are adsorbed by the activated carbon pellets of the activated carbon filter 1, are then released from the activated carbon pellets and are conducted to the engine by way of the connection 3. At the same time, fresh air is admitted to the filter 1 by way of the fresh air connection 5.

The process is repeated in accordance with the operating cycles of the engine that is, upon shutdown of the engine, hydrocarbons are adsorbed in the activated carbon filter without reaching the environment by way of the connection 5.

If possible, the filter layer 15 or the closure of highly adsorptive material in the second filter chamber 7 is heated upon startup of the engine. In this way, the hydrocarbons residing in the filter layer 15 or in the closure of highly adsorptive material can, on one hand, be rapidly released. On the other hand, the fresh air flowing into the activated carbon filter through the connection 5 is rapidly heated so that heated fresh air enters first the filter chamber 7 and then the filter chamber 6. As a result, the activated carbon pellets rapidly release any adsorbed hydrocarbons which then are supplied to the internal combustion engine. If appropriate, the heating of the fresh air takes place only for a short period for example for several seconds upon start-up of the internal combustion engine.

The closure of the filter chamber 7 by the filter layer 15 of a highly adsorptive material provides for a rapid adsorption of hydrocarbons. The highly adsorptive material adsorbs the hydrocarbons better than the activated carbon pellets. Heating of the filter layer or the respective closure provides for a rapid regeneration of the filter layer or, respectively, the closure, but it also provides for a rapid release of the hydrocarbons from the activated carbon pellets.

What is claimed is:

1. An activated carbon filter particularly for reducing vapor emissions from a fuel supply system, said activated carbon filter including a housing with a first connecting section providing for communication with the atmosphere, a second connecting section for communication with the fuel supply system, an activated carbon filter section disposed between said first and second connecting sections for communication with the fuel supply system, and a filter material layer of a highly adsorptive material disposed between said activated carbon filter section and said first connecting section, said highly adsorptive material consisting of at least one of zeolite, silicious gel, aluminum oxide, di-vinyl benzene styrol material and activated carbon fiber.

2. An activated carbon filter according to claim 1, wherein said filter layer consists of an electrically conductive highly adsorptive material and means are provided for electrically heating the filter layer.

3. An activated carbon filter according to claim 2, wherein said filter layer consists of one of an activated carbon fiber fabric and an activated carbon fiber fleece.

4. An activated carbon filter according to claim 1, wherein said activated carbon filter section comprises a housing portion with at least a first and a second chamber which are both filled with activated carbon pellets, and said second connecting section for communication with said fuel supply system is disposed adjacent said first chamber and said first connecting section for communication with the atmosphere is disposed adjacent said second chamber, and wherein said two chambers are in communication with each other by way of a filter layer of a fleece or fabric.

5. An activated carbon filter according to claim 4, wherein said filter layer is disposed at one end of said activated carbon filter opposite said connection sections and a spring-loaded pressure plate is disposed adjacent said filter layer for biasing said filter layer against the activated carbon pellets in said first and second chambers.

6. An activated carbon filter according to claim 1, wherein said second connection section includes a connection for communication with a fuel tank of a fuel supply system and a connection for communication with a vacuum arrangement of an internal combustion engine, a filter fleece or fabric covering the activated carbon filter section toward said vacuum communication connection, and said fuel tank connection including a tubular housing structure of a net-like filter fabric extending into the adjacent activated carbon filter section.

* * * * *